(12) United States Patent
Byun et al.

(10) Patent No.: US 7,416,010 B2
(45) Date of Patent: Aug. 26, 2008

(54) BONDING APPARATUS AND SYSTEM FOR FABRICATING LIQUID CRYSTAL DISPLAY DEVICE

(75) Inventors: Yong Sang Byun, Kyongsangbuk-do (KR); Sang Seok Lee, Taegu-kwangyokshi (KR); Sang Ho Park, Pusan-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 148 days.

(21) Appl. No.: 10/308,138

(22) Filed: Dec. 3, 2002

(65) Prior Publication Data

US 2003/0168176 A1   Sep. 11, 2003

(30) Foreign Application Priority Data

| Mar. 8, 2002 | (KR) | ................ 2002-12410 |
| Mar. 8, 2002 | (KR) | ................ 2002-12439 |
| Mar. 20, 2002 | (KR) | ................ 2002-15081 |

(51) Int. Cl.
B32B 37/00  (2006.01)

(52) U.S. Cl. .................................................. 156/580

(58) Field of Classification Search ............... 156/382, 156/358, 367, 378, 106, 107, 273.3, 274.8, 156/580; 349/155, 156, 187; 100/46; 347/187
See application file for complete search history.

(56) References Cited

U.S. PATENT DOCUMENTS

| 3,629,035 | A | * | 12/1971 | Kuroda ........................ 156/219 |
| 3,978,580 | A | | 9/1976 | Leupp et al. |
| 4,094,058 | A | | 6/1978 | Yasutake et al. ............... 29/592 |
| 4,310,376 | A | * | 1/1982 | Ebina et al. .................. 156/499 |
| 4,557,889 | A | * | 12/1985 | Masuda et al. ............... 264/320 |
| 4,653,864 | A | | 3/1987 | Baron et al. |
| 4,691,995 | A | | 9/1987 | Yamazaki et al. ............. 350/331 |
| 4,775,225 | A | | 10/1988 | Tsuboyama et al. |
| 5,225,025 | A | * | 7/1993 | Lambing et al. .............. 156/358 |
| 5,231,923 | A | * | 8/1993 | Ohta et al. ..................... 100/46 |
| 5,247,377 | A | | 9/1993 | Omeis et al. .................. 359/76 |
| 5,263,888 | A | | 11/1993 | Ishihara et al. |
| 5,379,139 | A | | 1/1995 | Sato et al. |

(Continued)

FOREIGN PATENT DOCUMENTS

CN       1286411 A       3/2001

(Continued)

OTHER PUBLICATIONS

Translation of JP2000-284295.*

(Continued)

*Primary Examiner*—Jeff H Aftergut
*Assistant Examiner*—Daniel McNally
(74) *Attorney, Agent, or Firm*—McKenna Long & Aldridge LLP

(57) ABSTRACT

A bonding apparatus for fabricating a liquid crystal display device includes a vacuum chamber for bonding first and second substrates together, an upper stage and a lower stage oppositely arranged in an upper space and a lower space of the vacuum chamber, and a pressure application system coupled to one of the upper and lower stages for applying first and second pressures to different parts of the one of the upper and lower stages.

1 Claim, 18 Drawing Sheets

U.S. PATENT DOCUMENTS

| | | | |
|---|---|---|---|
| 5,406,989 A | 4/1995 | Abe | |
| 5,407,519 A * | 4/1995 | Joffe et al. | 156/358 |
| 5,499,128 A | 3/1996 | Hasegawa et al. | |
| 5,507,323 A | 4/1996 | Abe | |
| 5,511,591 A | 4/1996 | Abe | 141/7 |
| 5,539,545 A | 7/1996 | Shimizu et al. | |
| 5,541,752 A * | 7/1996 | Taniguchi et al. | 349/132 |
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,928,399 A * | 7/1999 | Yakou et al. | 65/152 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | von Gutfeld et al. | 349/187 |
| 6,128,066 A * | 10/2000 | Yokozeki | 349/187 |
| 6,163,357 A | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 * | 10/2001 | Egami et al. | 349/189 |
| 6,337,730 B1 | 1/2002 | Ozaki et al. | |
| 6,414,733 B1 | 7/2002 | Ishikawa et al. | 349/110 |
| 6,665,043 B1 * | 12/2003 | Okuyama et al. | 349/187 |
| 2001/0021000 A1 | 9/2001 | Egami | |

FOREIGN PATENT DOCUMENTS

| | | |
|---|---|---|
| EP | 1 003 066 | 5/2000 |
| JP | 51-065656 | 6/1976 |
| JP | 57-38414 | 3/1982 |
| JP | 57-88428 | 6/1982 |
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 05-154923 | 6/1993 |
| JP | 5-265011 | 10/1993 |
| JP | 5-281557 | 10/1993 |
| JP | 5-281562 | 10/1993 |
| JP | H05-307160 | 11/1993 |
| JP | 06-018829 | 1/1994 |
| JP | H06-018829 | 1/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 06-235925 | 8/1994 |
| JP | 6-265915 | 9/1994 |
| JP | 06-313870 | 11/1994 |
| JP | 07-084268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 08-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 08-234211 | 9/1996 |
| JP | 8-240807 | 9/1996 |
| JP | 9-5762 | 1/1997 |
| JP | 9-26578 | 1/1997 |
| JP | H09-001026 | 1/1997 |
| JP | 09-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 09-281458 | 10/1997 |
| JP | 9-281458 | 10/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-29035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-0193988 | 7/2000 |
| JP | 2000-0241824 | 9/2000 |
| JP | 2000-284295 * | 10/2000 |
| JP | 2000-284295 | 10/2000 |
| JP | 2000-0292799 | 10/2000 |

| | | |
|---|---|---|
| JP | 2000-298272 | 10/2000 |
| JP | 2000-0310759 | 11/2000 |
| JP | 2000-0310784 | 11/2000 |
| JP | 2000-0338501 | 12/2000 |
| JP | 2001-005401 | 1/2001 |
| JP | 2001-5405 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-23176 | 1/2002 |
| JP | 10-2002-0010111 | 2/2002 |
| JP | 2002-49045 | 2/2002 |
| JP | 2002-079160 | 3/2002 |
| JP | 2002-080321 | 3/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122870 | 4/2002 |
| JP | 2002-122872 | 4/2002 |
| JP | 2002-122873 | 4/2002 |
| JP | 2002-131762 | 5/2002 |
| JP | 2002-139734 | 5/2002 |
| JP | 2002-156518 | 5/2002 |
| JP | 2002-169166 | 6/2002 |
| JP | 2002-169167 | 6/2002 |
| JP | 2002-182222 | 6/2002 |
| JP | 2002-202512 | 7/2002 |
| JP | 2002-202514 | 7/2002 |
| JP | 2002-214626 | 7/2002 |
| JP | 2002-229042 | 8/2002 |
| JP | 2002-236276 | 8/2002 |
| JP | 2002-258299 | 8/2002 |
| JP | 2002-236292 | 9/2002 |
| JP | 2002-277865 | 9/2002 |
| JP | 2002-277866 | 9/2002 |
| JP | 2002-277881 | 9/2002 |
| JP | 2002-287156 | 10/2002 |
| JP | 2002-296605 | 10/2002 |
| JP | 2002-311438 | 10/2002 |
| JP | 2002-311440 | 10/2002 |
| JP | 2002-311442 | 10/2002 |
| JP | 2002-323687 | 11/2002 |
| JP | 2002-323694 | 11/2002 |
| JP | 2002-333628 | 11/2002 |
| JP | 2002-333635 | 11/2002 |
| JP | 2002-333843 | 11/2002 |
| JP | 2002-341329 | 11/2002 |
| JP | 2002-341355 | 11/2002 |
| JP | 2002-341356 | 11/2002 |
| JP | 2002-341357 | 11/2002 |
| JP | 2002-341358 | 11/2002 |
| JP | 2002-341359 | 11/2002 |
| JP | 2002-341362 | 11/2002 |
| KR | 2000-0035302 | 6/2000 |

OTHER PUBLICATIONS

Machine Translation of JP 2001-255542.*
Machine Translation of JP06-018829A.*

* cited by examiner

BONDING APPARATUS AND SYSTEM FOR FABRICATING LIQUID CRYSTAL DISPLAY DEVICE

This application claims the benefit of the Korean Application Nos. P2002-0012410, P2002-0012439, and P2002-0015081, filed on Mar. 8, 2002, Mar. 8, 2002, and Mar. 20, 2002 respectively, which are hereby incorporated by reference.

BACKGROUND OF THE INVENTION

1. Field of the Invention

The present invention relates to a bonding apparatus, and more particularly, to a bonding apparatus and system for fabricating a liquid crystal display device.

2. Background of the Related Art

As demands on display devices increases, various flat display panel device, such as liquid crystal display (LCD), plasma display panel (PDP), ELD electro-luminescent display (ELD), and vacuum fluorescent display (VFD) devices have been proposed. The LCD devices have been commonly used as mobile displays to replace cathode ray tube (CRT) devices because of their excellent picture quality, light weight, thin profile, and low power consumption. In addition, mobile type LCDs, such as monitors for notebook computers, are being developed for televisions to receive and display broadcasting signals, and as monitors of computers.

Despite various technical developments for the LCD devices, efforts for enhancing picture quality of the LCD devices have been inconsistent. Accordingly, in order for the LCD devices to be deployed as a general use display device, the LCD devices must have high picture quality, i.e., high definition and luminance, and must be of a large size while maintaining the features of light weight, thin profile, and low power consumption.

LCD devices may be fabricated by an LCD injection method, in which one substrate having a sealant pattern formed thereon, which includes an injection hole, is bonded to the other substrate under a vacuum, and liquid crystal material is injected therein through the injection hole. Alternatively, the LCD devices may be fabricated using a liquid crystal dropping method, as disclosed in Japanese Patent Publication Nos. H11-089612, and H11-172903, in which one substrate having liquid crystal dropped thereon and the other substrate are provided, and the two substrates, placed opposite along a vertical direction, are bonded together. Of the two methods, the liquid crystal dropping method is advantageous in that different components can be dispensed directly onto the substrate surface.

FIG. 1 is a cross sectional view of a liquid crystal display bonding apparatus during a loading procedure according to the related art. In FIG. 1, the bonding apparatus is provided with a frame 10 forming an outer shape, an upper stage 21, a lower stage 22, a sealant outlet part (not shown), a liquid crystal dropping part 30, upper chamber part 31, lower chamber part 32, a chamber moving system 40, and a stage moving system 64. The sealant outlet part (not shown) and the liquid crystal dropping part 30 are attached to a side of the frame 10, and the upper and lower chamber parts 31 and 32 are detachable from each other.

The chamber moving system 40 includes a driving motor for selectively moving the lower chamber part 32 to a location during a bonding procedure, or to a location where discharge of the sealant and dropping of the liquid crystal material are performed.

The stage moving system 64 is provided with a motor, shafts 61, a housing 62, a linear guide 63, a ball screw 65, and a nut housing 66. The upper stage 21 is held by the shafts 61 that are attached to the housing 66. The housing 66 is attached to the frame 67 with a linear guide, and the motor 64 is attached to a bracket 68 on the frame 67 for driving the nut housing 66 along upward and downward directions. Driving power is transmitted by the ball screw 65 and the nut housing 66, which is connected to the housing 66 through a load cell 69.

Process steps for fabricating an LCD using the bonding apparatus according to the related art will now be explained. Initially, an upper substrate 51 is loaded on the upper stage 21, and a lower substrate 52 is loaded onto the lower stage 22. Accordingly, as shown in FIG. 1, the lower chamber part 32 having the lower stage 22 is moved to a location for sealant coating and liquid crystal dropping by the chamber moving system 40.

Next, as shown in FIG. 2, when the sealant coating and the liquid crystal dropping are finished by the sealant outlet part (not shown) and the liquid crystal dropping part 30, the lower chamber unit 32 is moved to a location for bonding the upper and lower substrates 51 and 52 by the chamber moving system 40. Then, the upper and lower chamber units 31 and 32 are aligned by the chamber moving system 40, and the upper and lower chamber parts 31 and 32 are attached together to form a closed chamber. Next, pressure within the closed chamber is reduced using a vacuum system to create a vacuum state within the closed chamber. Then, the shaft 61 is moved along the downward direction by the motor 64, thereby moving the upper stage 21 to bond the upper and lower substrates 51 and 52 together. The load cell 69 functions as a pressure sensor for controlling the motor 64 with reference to a load signal generated by the load cell 69. Accordingly, an amount of bonding pressure may be controlled at a preset value.

However, the bonding apparatus according to the related art has the following problems. First, a positional variation of the system for moving the upper stage 21 along the upward and downward directions is created after a repeated period of use. Accordingly, an error due to the flatness of the upper stage is created. In addition, since the drive shafts 65 of the stage moving system receive driving forces from the driving motor 64 to move the upper stage 21 along the downward direction with a precise force, an accurate flatness setting of the upper stage 21 has been difficult to achieve prior to initial processing.

Second, wear at particular parts of the upper stage 21 may cause defective bonding at particular parts of the upper and lower substrates 51 and 52. Accordingly, when a height difference along a lower surface of the upper stage 21 is created, bonding of the upper and lower substrates 51 and 52 is defective. For example, as shown in FIG. 3, during bonding of the upper and lower substrates 51 and 52, dispersion of the spread of the liquid crystal material LC is not adequate. Accordingly, a gap S is formed between adjacent sealant parts, thereby preventing equal dispersion of the liquid crystal material LC. For example, when a portion of the lower substrate 52 has the liquid crystal material LC dropped thereon is higher than a portion where the sealant is coated, the load cell 69 (in FIGS. 1 and 2) reads that bonding of the upper and lower substrates 51 and 52 is completed even if the portion having the sealant coated thereon is not adequately pressed. Thus, without adequate pressing of the sealant, the portion of the seal breaks. The broken seal results in improper bonding of the upper and lower substrates 51 and 52, and allows ambient air to infiltrate into the device.

SUMMARY OF THE INVENTION

Accordingly, the present invention is directed to a bonding apparatus for fabricating a liquid crystal display device that substantially obviates one or more of the problems due to limitations and disadvantages of the related art.

An object of the present invention is to provide a bonding apparatus for fabricating a liquid crystal display device that can measure stage flatness before substrate bonding and compensate for a difference between portions of the stages.

Another object of the present invention is to provide a supplemental pressure application device in a bonding apparatus for fabricating a liquid crystal display device where an increased force can be applied to a specific portion of bonded substrates.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a bonding apparatus for fabricating a liquid crystal display device includes a vacuum chamber for bonding first and second substrates together, an upper stage and a lower stage oppositely arranged in an upper space and a lower space of the vacuum chamber, and a pressure application system coupled to one of the upper and lower stages for applying first and second pressures to different parts of the one of the upper and lower stages.

In another aspect, a bonding apparatus for fabricating a liquid crystal display includes a vacuum chamber for bonding first and second substrates together, an upper stage and a lower stage oppositely arranged in an upper space and a lower space of the vacuum chamber, at least one recess formed in a working surface of at least one of the upper and lower stages, and a supplemental pressure application system provided within the recess projected from the working surface.

In another aspect, a supplemental pressure application system in a bonding apparatus for bonding first and second substrates together includes a removable pressure application mask having a plurality of projection parts projecting toward a sealant region of one of the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
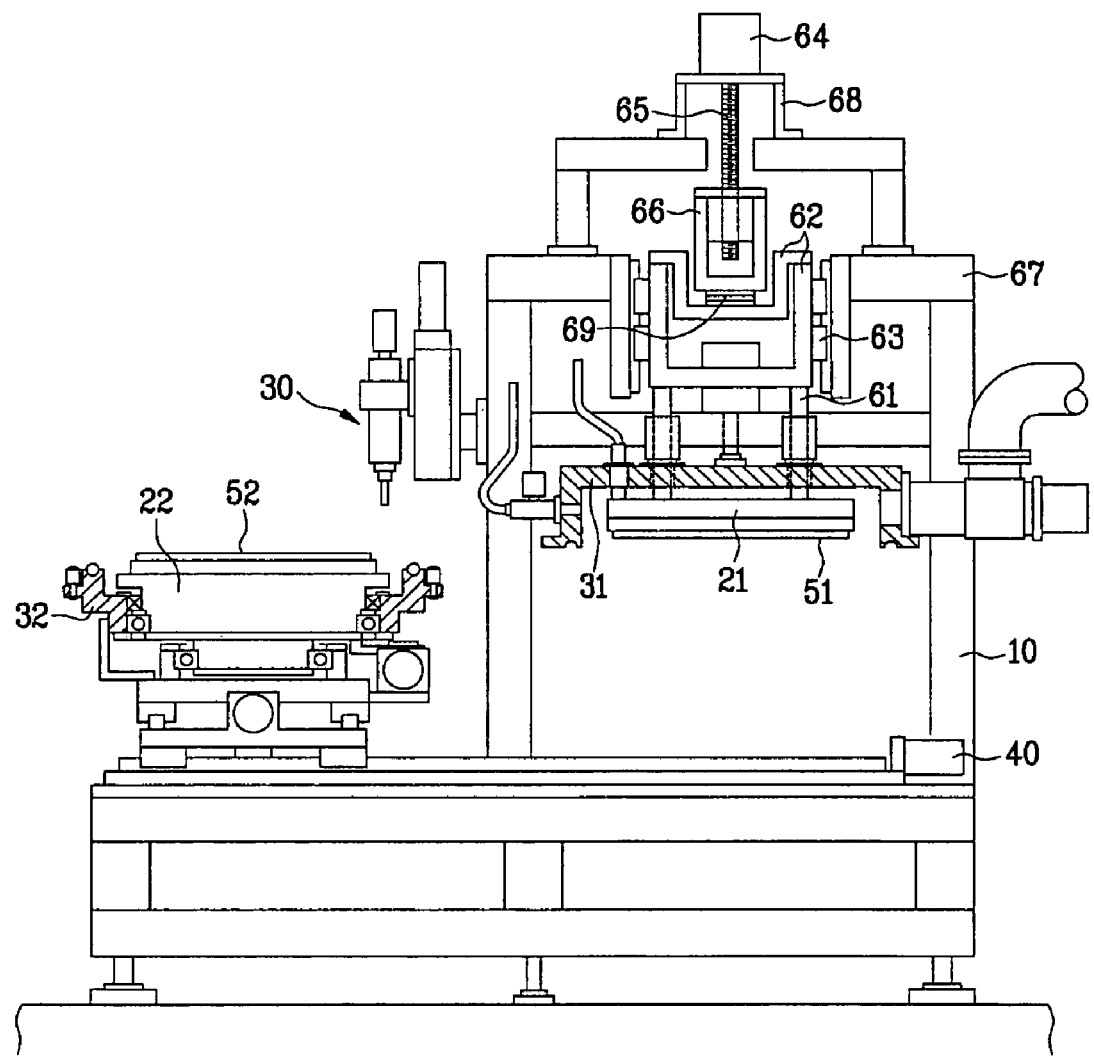
FIG. 1 is a cross sectional view of a liquid crystal display bonding apparatus during a loading procedure according to the related art.
Figure 2:
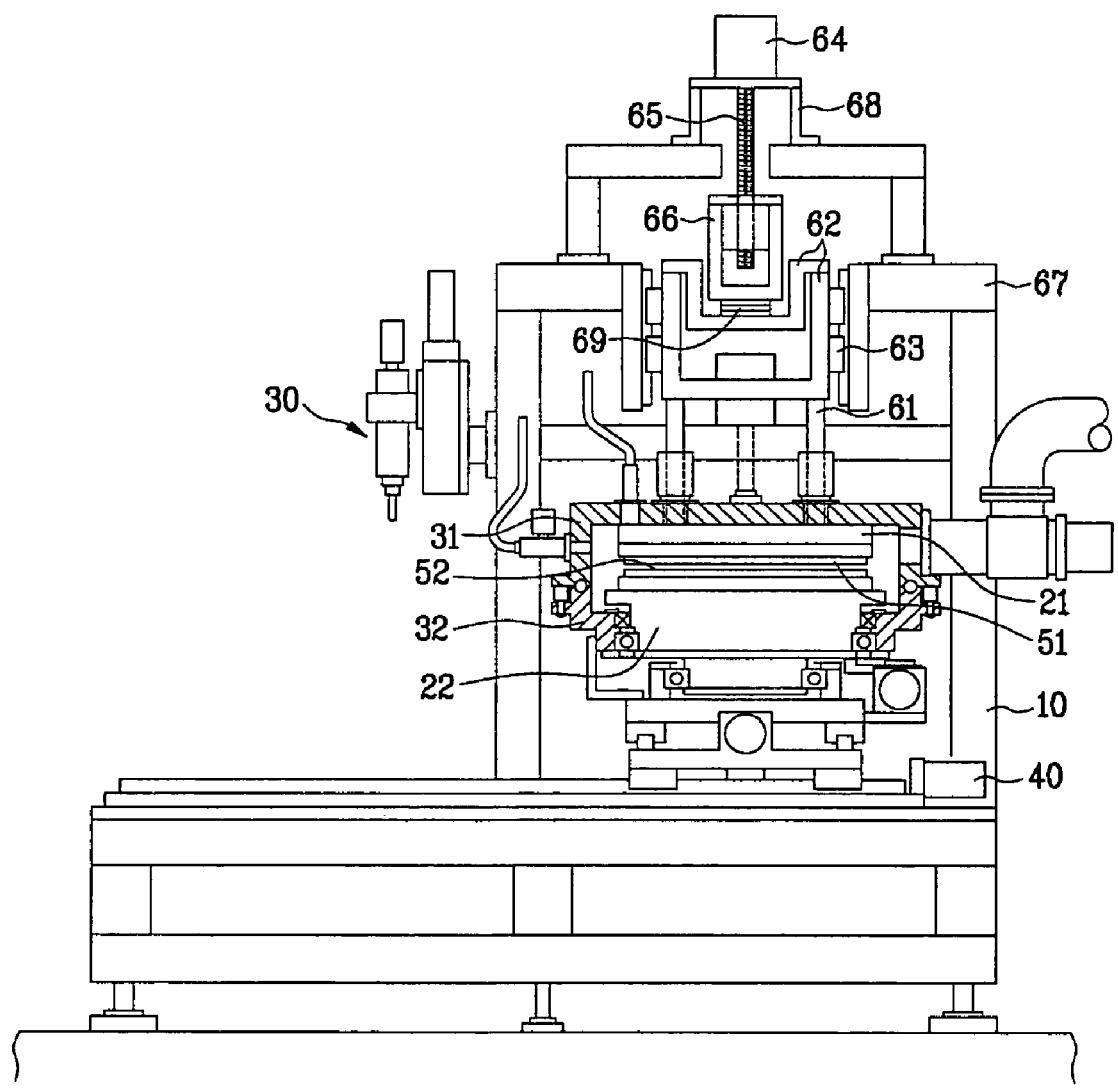
FIG. 2 is a cross sectional view of the liquid crystal display bonding apparatus during a bonding procedure according to the related art.
Figure 3:
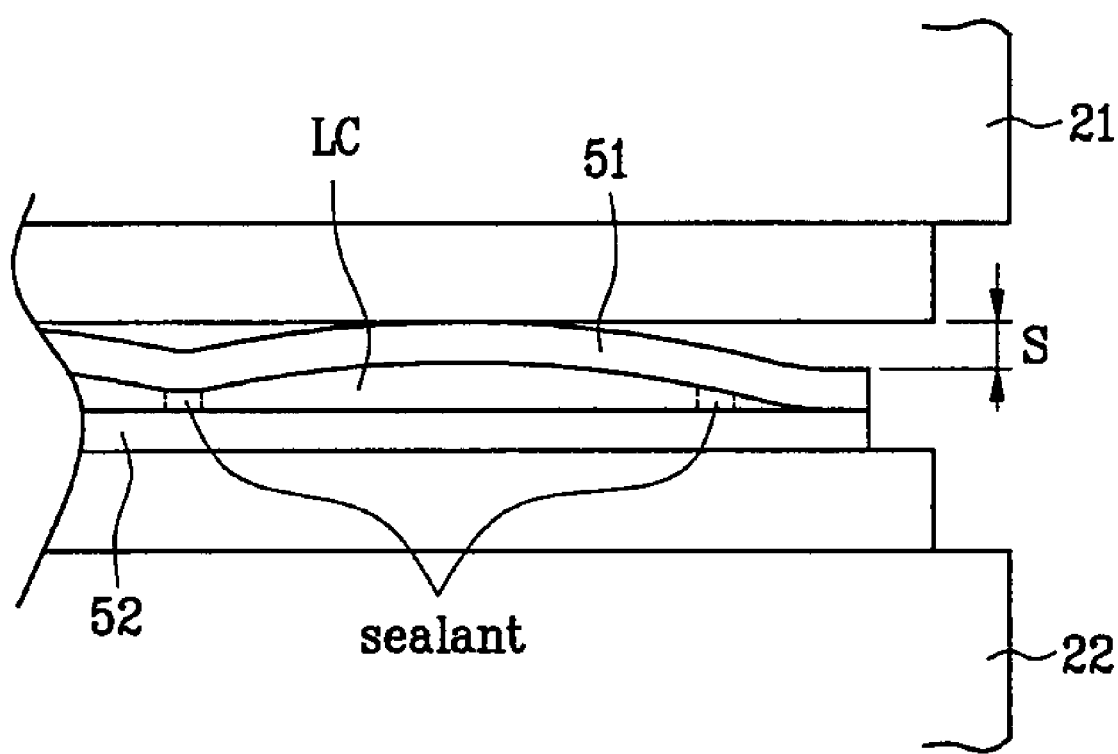
FIG. 3 is an enlarged cross sectional view of a liquid crystal display bonding apparatus during a bonding procedure according to the related art.
Figure 4:
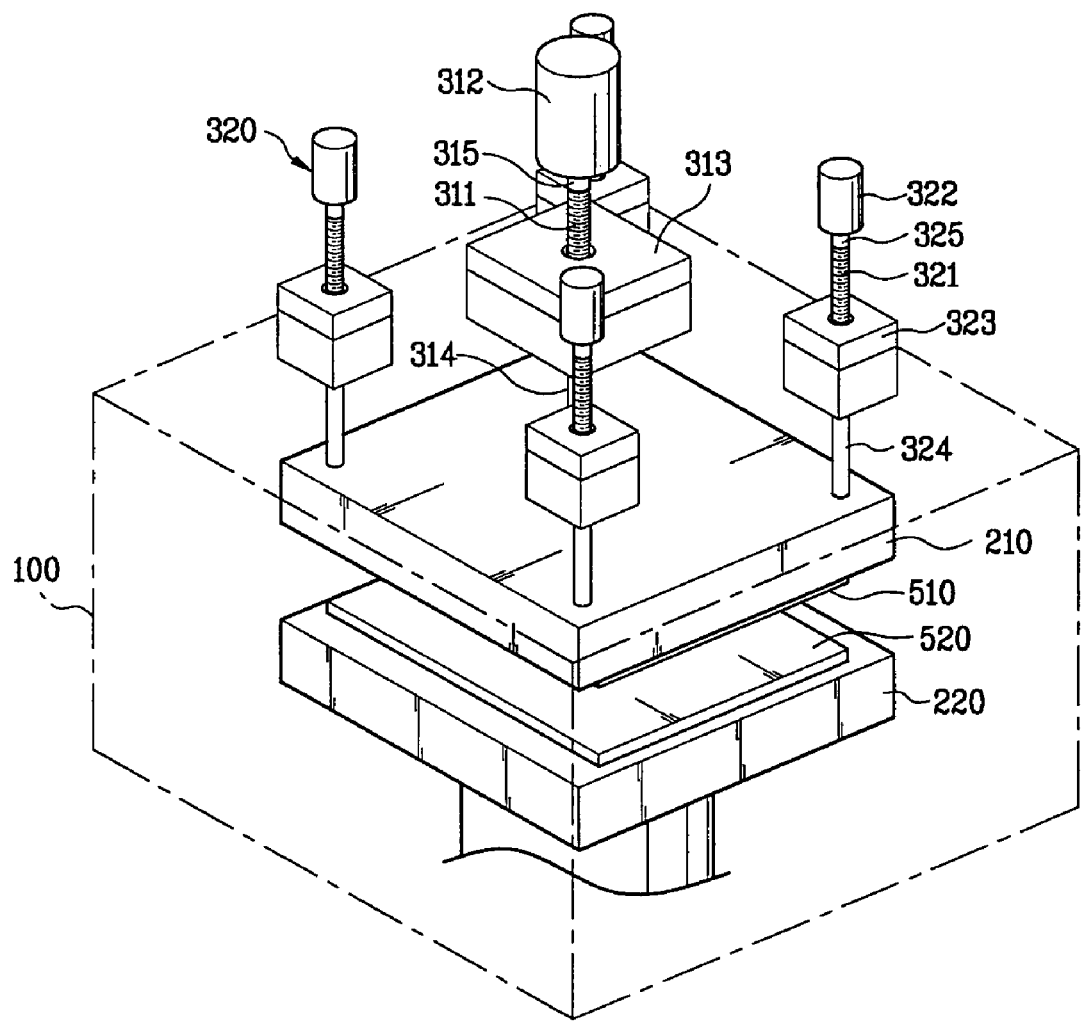
FIG. 4 is a perspective view of an exemplary pressure application system in accordance with the present invention.

FIG. 4 is a perspective view of an exemplary pressure application system in accordance with the present invention. In FIG. 4, the pressure application system may be positioned within a vacuum chamber 100 for bonding upper and lower substrates 510 and 520. The pressure application system may include an upper stage 210 and a lower stage 220 positioned within an upper space and a lower space of the vacuum chamber 100, respectively. In addition, the pressure application system may include a main pressure applying system and more than one supplemental pressure application system. The main pressure application system may be positioned to central portions of the upper and/or lower stages 210 and 220 for applying pressures to the upper and lower substrates 510 and 520 during a bonding process.

The main pressure application system may include a main helical shaft 311 for moving the main pressure application system along upward and downward directions, a main driving motor 312 for moving the main helical shaft 311 along the upward and downward directions, a nut housing 313 coupled to the main helical shaft 311, and a main movable shaft 314 connected to the nut housing 313. The main driving motor 312 may be coupled to the main helical shaft 311 and may be attached to a frame (not shown). The main movable shaft 314 may be connected to a central part of a top surface of the upper stage 210, or may be connected to a central part of a bottom surface of the lower stage 220. In addition, the main pressure application system may include a main load cell 315 for varying an applied pressure through the main movable shaft 314, and may be attached to the main helical shaft 311.

The supplemental pressure application system may be attached along peripheral surfaces of the upper and lower stages 210 and 220 for applying a compensating pressure or an additional pressure during a bonding process of the upper and lower substrates 510 and 520. The supplemental pressure application system may include at least one sub-helical shaft 321, at least one sub-driving motor 322, a nut housing 323 coupled to the sub-helical shaft 321, a sub-movable shaft 324 coupled to the nut housing 323, and at least one sub-load cell 325. The sub-helical shafts 321 may be coupled to the sub-driving motors 322, and the sub-driving motors 322 may be attached to the frame (not shown). The sub-driving motors 322 may selectively move the helical shafts 321 along the upward and downward direction for applying pressure to the upper and lower substrates 510 and 520 during the bonding process. The sub-movable shafts 324 may be attached along peripheral portions of the top surface of the upper stage 210, or may be attached along peripheral portions of the bottom surface of the lower stage 220. For example, each one of the sub-movable shafts 324 may be attached to the upper surface of the upper stage 210 at each corner of the upper stage 210, or at a middle portion of a long side of the upper stage 210, or at a middle portion of a short side of the upper stage 210. In addition, each one of the sub-movable shafts 324 may be attached to the bottom surface of the lower stage 220 at each corner of the lower stage 220, or at a middle portion of a long side of the lower stage 220, or at a middle portion of a short side of the lower stage 220. Accordingly, compensation caused by positional variations of the upper and lower stages 210 and 220 may be performed due to uneven wear of the upper and lower stages 210 and 220.

The sub-load cells 325 may be connected to the sub-helical shafts 321 to vary the pressures to be applied to the sub-helical shafts 321. The main load cell 315 and the sub-load cells 325 may be connected to a controller (not shown), or respective controllers (not shown) to control operation of the bonding apparatus by transmission of feedback/control signals.

In addition, a flatness measuring system (not shown), such as position sensors (optical sensors), dial gauges, and pressure sensitive paper may be provided for determining an occurrence of deviation, or wear, at particular portions of the upper and lower stages 210 and 220. The various position sensors, like the optical sensors, may be attached to an interior or exterior of the vacuum chamber 100. Accordingly, the sensors may provide for real-time measurement of the deviation.

In the pressure application system of the bonding apparatus according to the present invention, the driving motors 312 and 322 may be attached to the frame (not shown), or to an exterior wall of the vacuum chamber 100, wherein the movable shafts 314 and 324 may be connected to the upper, or lower stages 210 and 220 that may pass through a top portion or a bottom portion of the vacuum chamber 100. Thus, the upper and lower stages 210 and 220 may receive driving forces via the helical shafts 311 and 321 by the nut housings 313 and 323, respectively. Accordingly, portions of the vacuum chamber 100 that couple to the movable shafts 314 and 324 may be sealed for maintaining a vacuum state of the vacuum chamber 100 during the bonding process.

The bonding apparatus according to the present invention may include a main helical shaft 311 for moving the upper stage 210 along the upward and downward directions, and four sub-helical shafts 321 for providing correction due to a lack of flatness of the upper stage 210, and for setting a flatness reference of the upper stage 210 before starting an initial stage of the bonding process. Accordingly, different pressures may be applied during the bonding process when deviations caused by prolonged use or wear occur.

An exemplary process for bonding substrates using the bonding apparatus in accordance with the present invention will now be explained.

Figure 5:
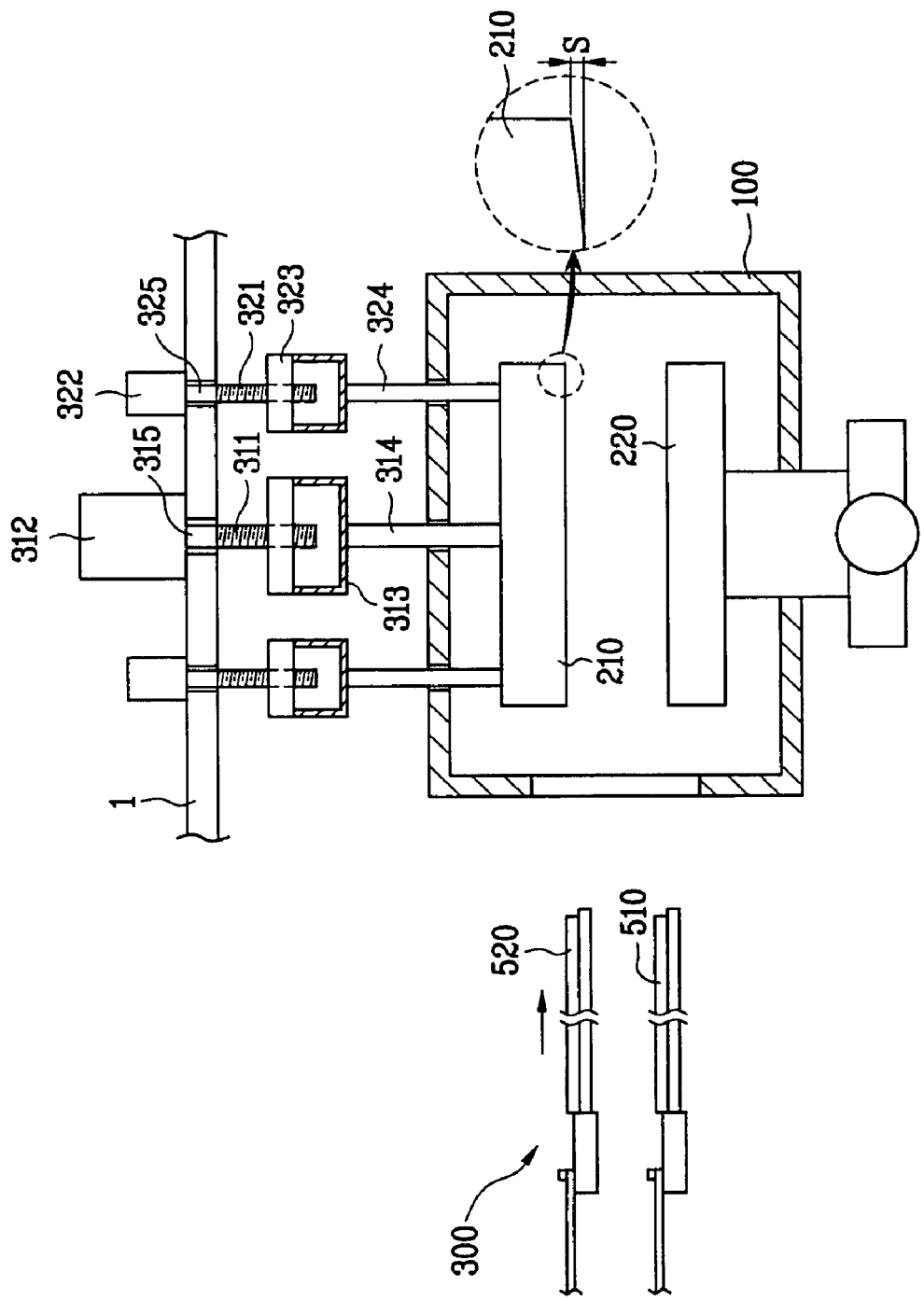
FIG. 5 is a cross sectional view of an exemplary pressure application system within a vacuum chamber in accordance with the present invention.

FIG. 5 is a cross sectional view of an exemplary pressure application system within a vacuum chamber in accordance with the present invention. In FIG. 5, when a bonding apparatus is repeatedly driven, the upper and lower stages 210 and 220 may become worn. Accordingly, surfaces of the upper and lower stages 210 and 220 may not be completely parallel. When a particular portion of the upper stage 210 is determined to be at least partially worn, a degree of deviation S and positional coordinates of the deviated portion may be stored in a controller (not shown).

Figure 6:
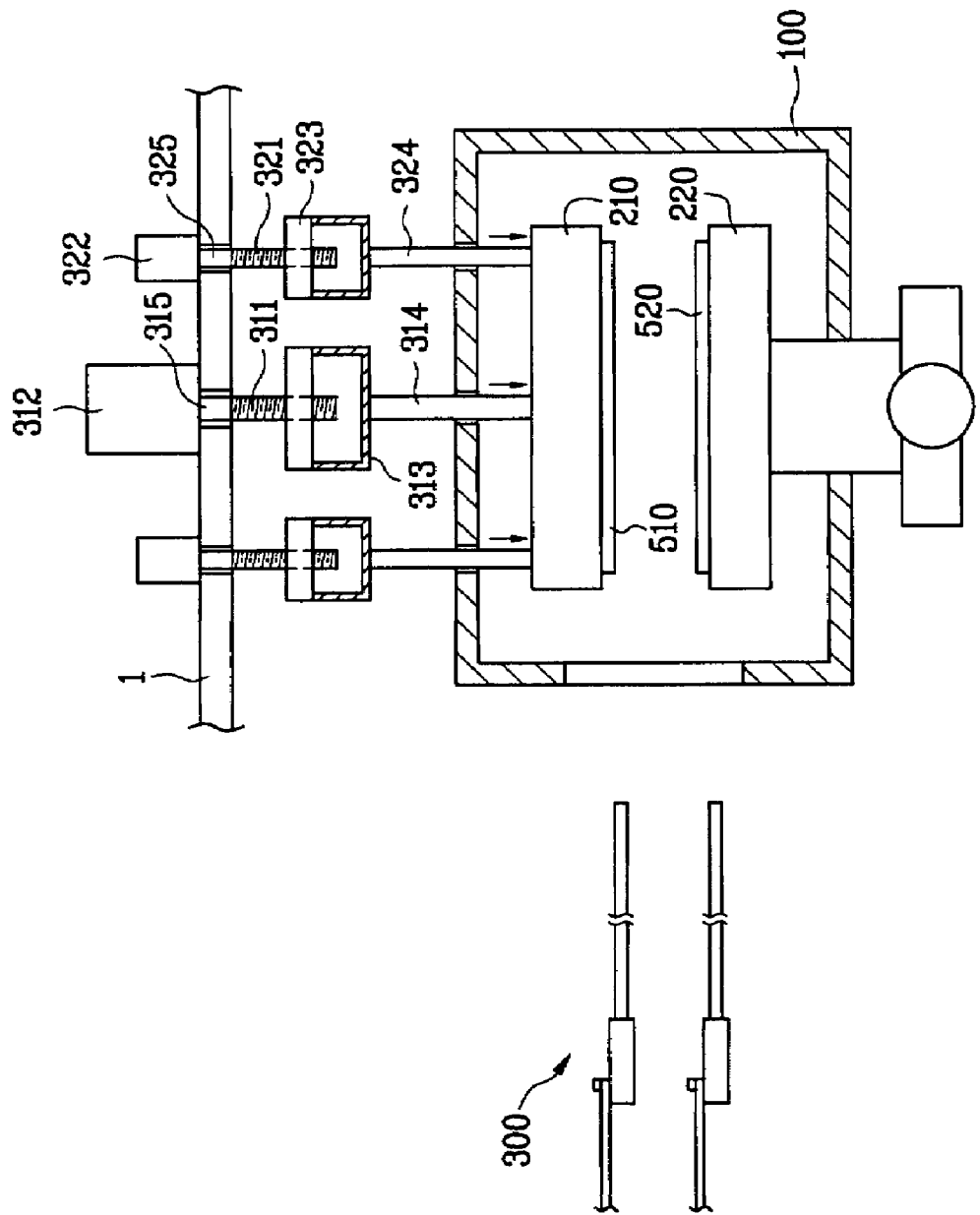
FIG. 6 is a cross sectional view of the pressure application system prior to a bonding procedure in accordance with the present invention.

FIG. 6 is a cross sectional view of the pressure application system prior to a bonding procedure in accordance with the present invention. In FIG. 6, when the bonding apparatus is enabled, substrates 510 and 520 may be loaded onto the upper and lower stages 210 and 220, respectively, positioned within a vacuum chamber 100 by a robot arm 300. Then, after the substrates 510 and 520 are loaded on the upper and lower stages 210 and 220, respectively, the vacuum chamber 100 may be sealed.

Figure 7:
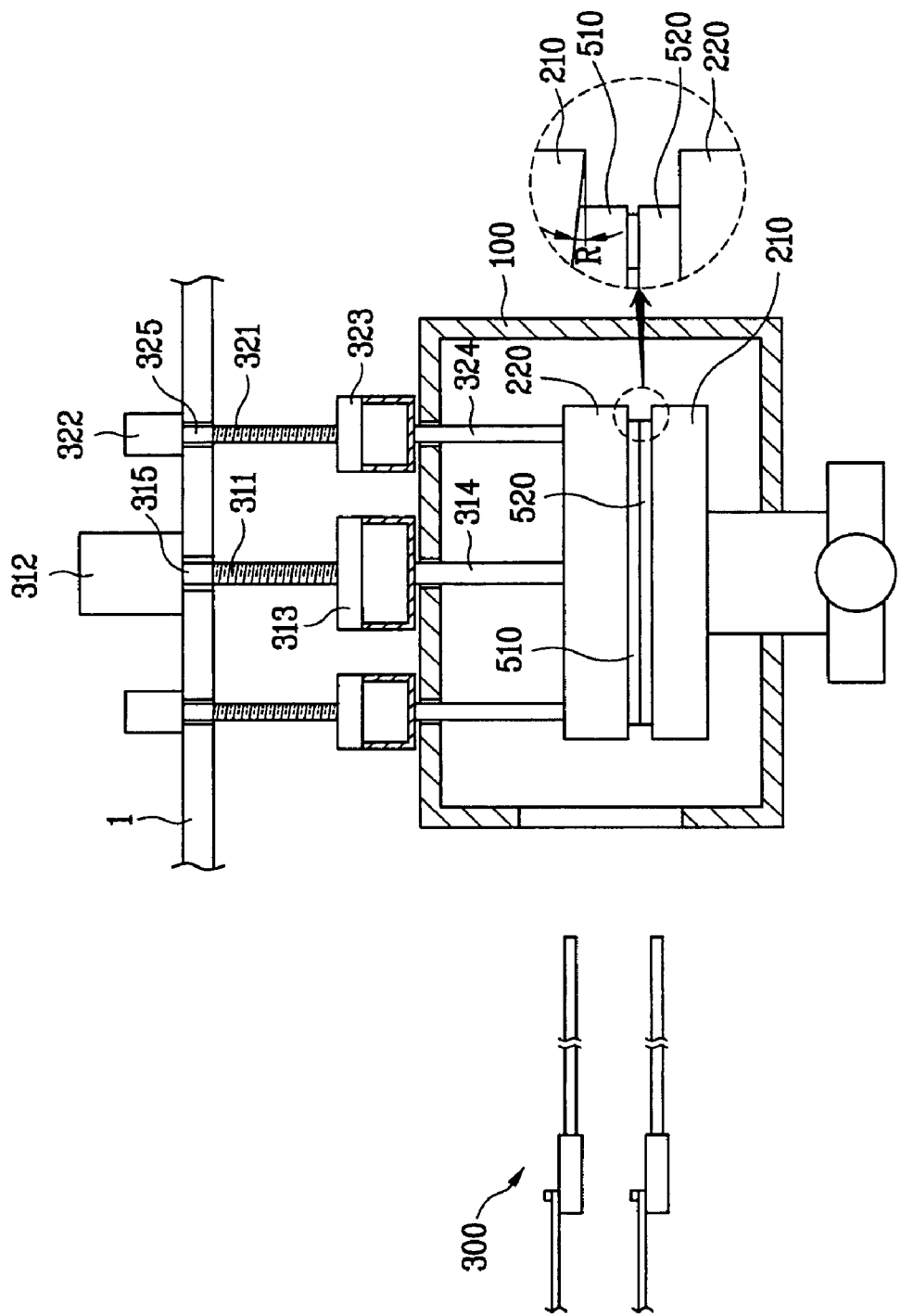
FIG. 7 is a cross sectional view of the pressure application system during a bonding procedure in accordance with the present invention.

FIG. 7 is a cross sectional view of the pressure application system during a bonding procedure in accordance with the present invention. In FIG. 7, the vacuum chamber 100 may be evacuated, the controller (not shown) may drive the driving motors 312 and 322 to move the helical shafts 311 and 321 connected to the upper stage 210 along the downward direction. During the driving of the driving motors 312 and 321 by the controller, the degree of deviation S of the particular portions of the upper and lower stages 210 and 220 may be determined. Then, a compensation value R required for the degree of deviation may be calculated, and a position of the deviation may be determined for compensating the calculated compensation value R in setting a distance of the downward movement of one of the sub-helical shafts 321. The calculation of the compensation value and the compensation method may be performed using an automated program and automated program controller (not shown), or may be performed using a manual calculated and a manual operation by an individual.

During the bonding process, the load cells 315 and 325 attached to the main and supplemental pressure application systems may continue to measure amounts of pressure being supplied by the helical shaft 311 and the sub-helical shafts 321. Accordingly, the load cells 315 and 325 may provide feedback signals to the controller (not shown) to vary the control signals transmitted to the driving motors 312 and 322. Thus, the load cells 315 and 325, the helical shaft 311, the sub-helical shafts 321, and the drive motors 312 and 322 may compensate for the degree of deviation S (in FIG. 5).

For example, when a particular corner portion of the upper stage 210 has a deviation of about 2 mm in comparison to other portions of the upper stage 210, the controller (not shown) may set a rotation amount of the sub-helical shaft 321 so that the sub-movable shaft 324 attached to the particular corner portion of the upper stage 210 may be moved along the downward direction by a distance corresponding to the 2 mm deviation amount. In addition, the nut housing 323 may be moved along the downward direction according to the rotation amount in order to move the sub-movable shaft 324 along the downward direction. Accordingly, after the supplementary pressure application system compensates for the deviation, the driving motors 312 and 322 may be driven according to the compensated set values, thereby bonding the substrates 510 and 520 together.

In addition, if a portion of the upper stage 210 having the deviation is not positioned at a corner portion of the upper stage 210, but at a portion of the upper stage 210 located between adjacent ones of the sub-movable shafts 324, setting values of the driving motors 322 for the adjacent ones of the sub-movable shafts 324 may be compensated.

Figure 8:
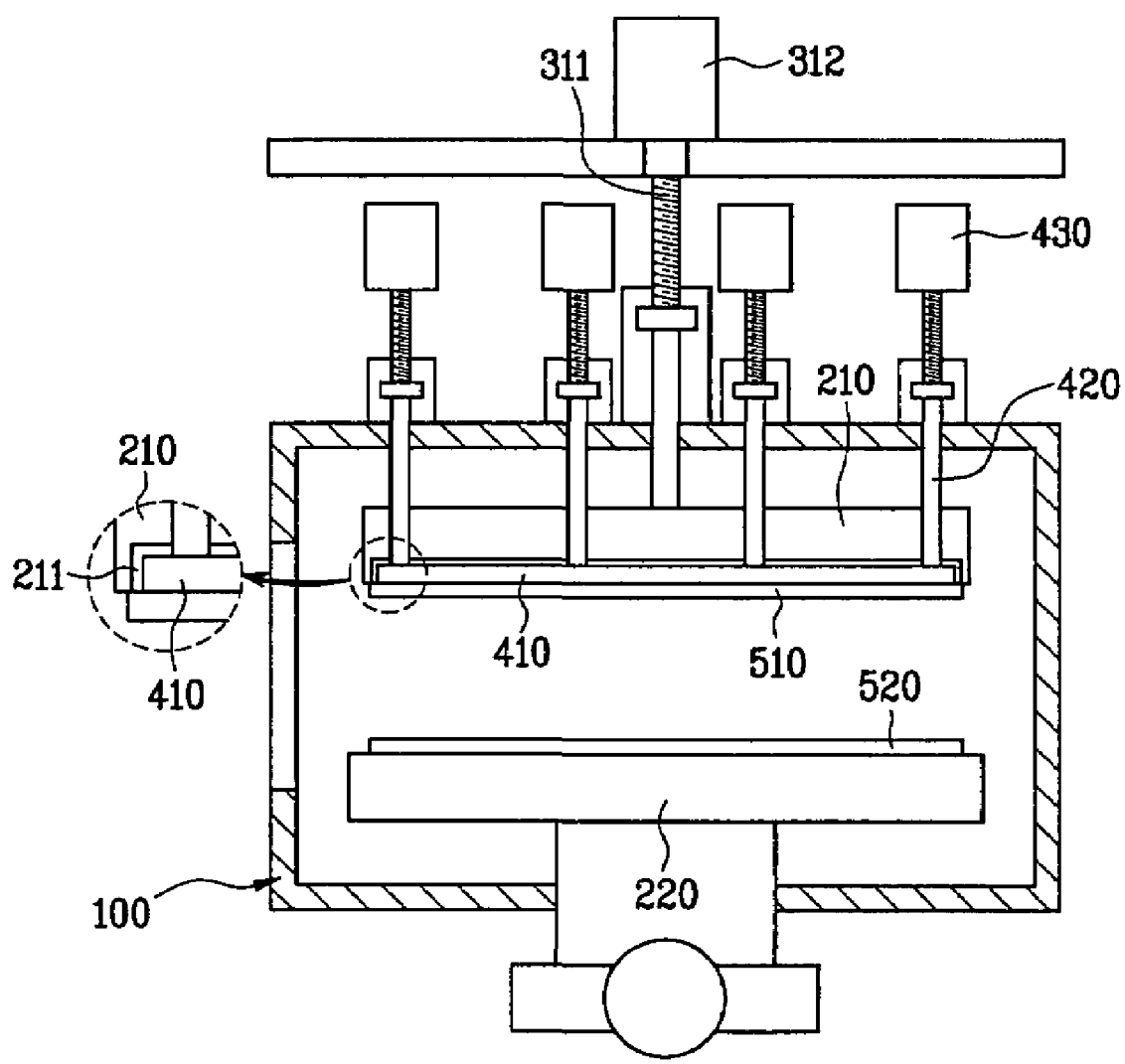
FIG. 8 is a cross sectional view of an exemplary supplemental pressure application system in accordance with the present invention.

FIG. 8 is a cross sectional view of an exemplary supplemental pressure application system in accordance with the present invention. In FIG. 8, the supplemental pressure application system may include upper and lower stages 210 and 220, wherein the upper stage 210 may include a pressing part 410, at least one elevating shaft 420, and at least one driving part 430. Likewise, although not shown, the lower stage 220 may also include a pressing part, at least one elevating shaft, and at least one driving part. The pressing part 410 may be formed as one unit for moving along the upward and downward directions by application of moving forces from the elevating shafts 420. The elevating shafts 420 may pass through the upper stage 210, and the upper stage 210 may include a recess 211 located along a working plane, i.e., bottom surface, of the upper stage 210 for receiving the pressing part 410. The pressing part 410 may include a material that prevents the upper substrate 510 from being scratched.

A portion of the upper and/or lower substrates 510 and 520 to be pressed down by the pressing part 410 may include a sealant material coated thereon, or may include a dummy region 512 (in FIG. 15) formed thereon. The recess 211 formed within the upper stage 210 may correspond to the portion of the upper and/or lower substrates 510 and 520 where the sealant is coated thereon, or may correspond to the dummy region 512 (in FIG. 15).

The driving parts 430 may move along the upward and downward directions via the elevating shafts 420. The driving parts 430 may include hydraulic and/or pneumatic cylinders, or motors for applying pressure. A total number of the driving parts may be determined in order to uniformly transmit the pressure of the driving part 430 to the pressing part 410.

Figure 9:
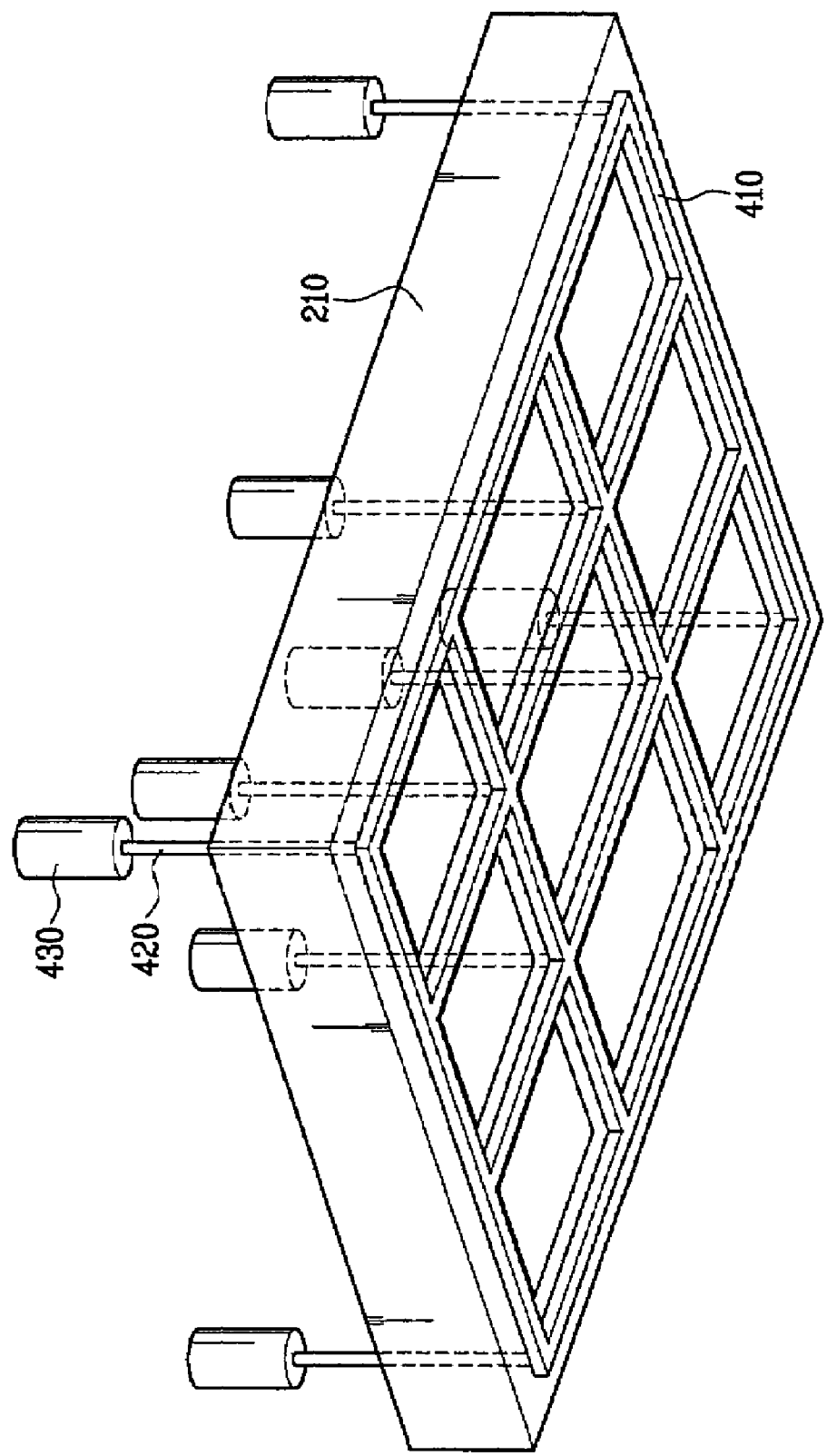
FIG. 9 is a perspective view of the supplemental pressure application system in accordance with the present invention.

FIG. 9 is a perspective view of the supplemental pressure application system in accordance with the present invention. In FIG. 9, the pressing part 410 may include an array of interconnected cross members. Each of the driving parts 430 may be connected to corners of outermost cross members and at intersections of innermost cross members via the elevated shafts 420.

Figure 10:
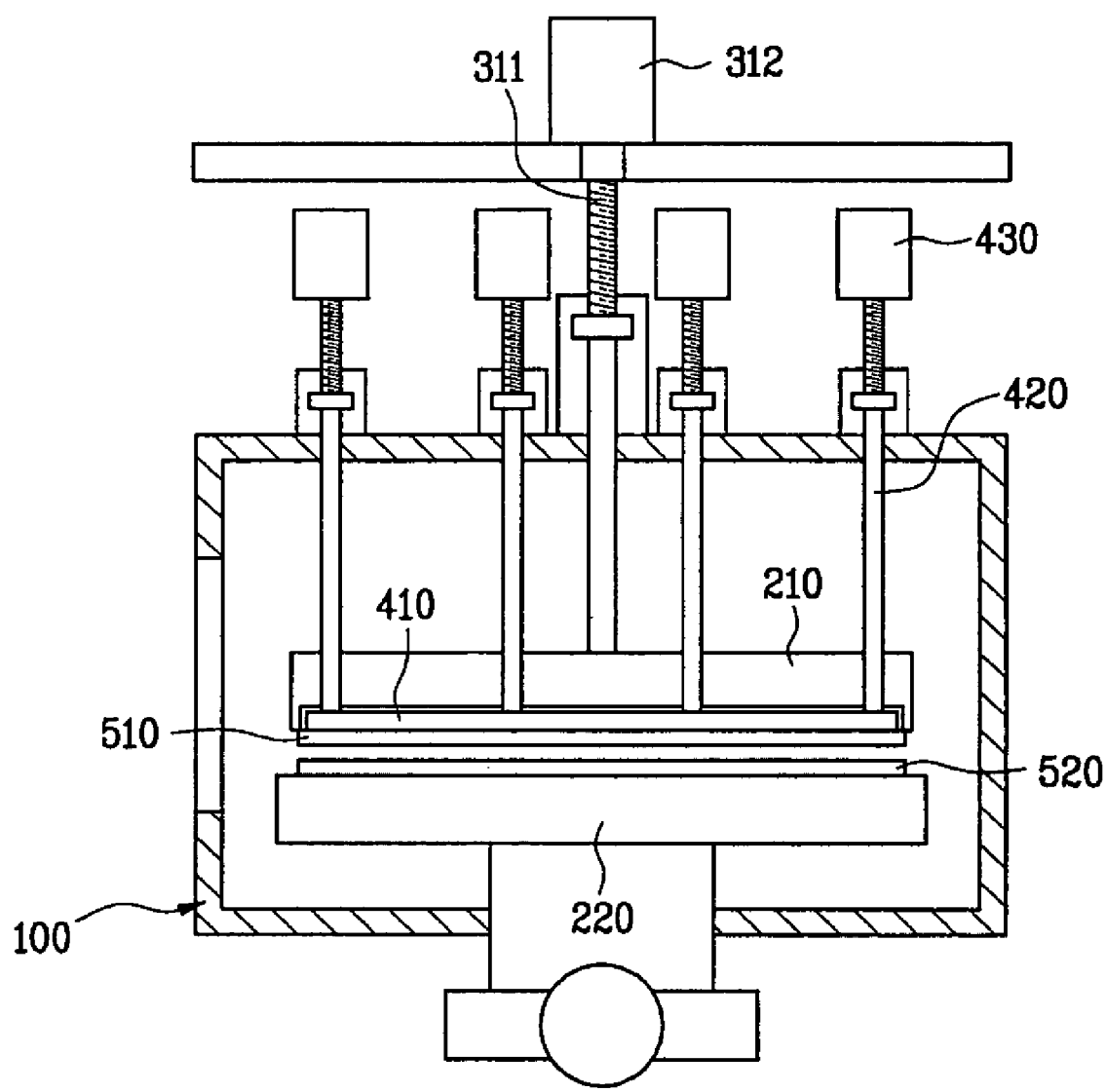
FIG. 10 is a cross sectional view of the supplemental pressure application system prior to a bonding procedure in accordance with the present invention.

FIG. 10 is a cross sectional view of the supplemental pressure application system prior to a bonding procedure in accordance with the present invention. In FIG. 10, during a bond process, a vacuum chamber 100 may be evacuated once upper and lower substrates 510 and 520 are loaded onto upper and lower stages 210 and 220, respectively. Then, a main pressure application system may be enabled to move the upper stage 210 along a downward direction, thereby bond the upper and lower substrates 510 and 520 respectively held at the upper and lower stages 210 and 220 together.

Figure 11:
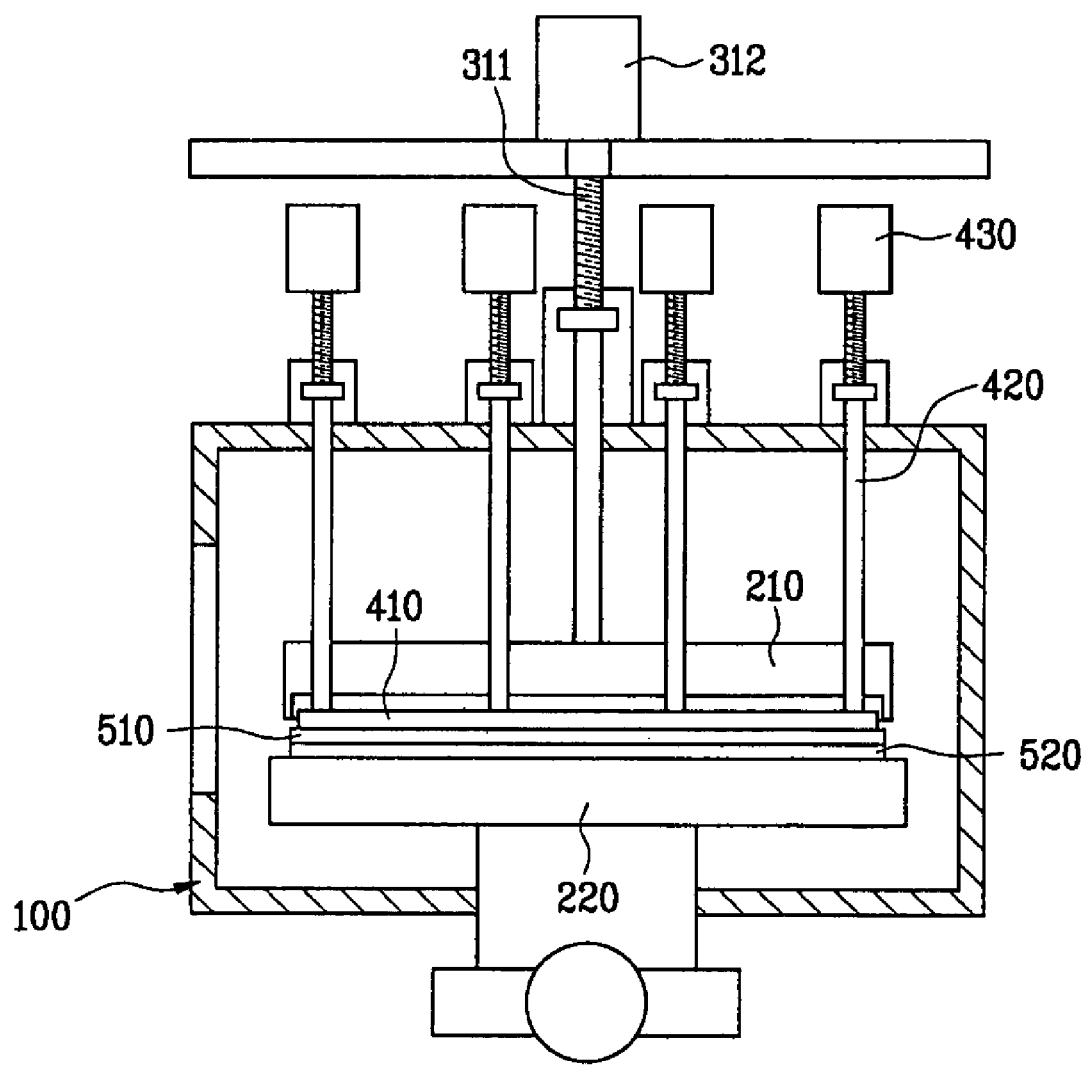
FIG. 11 is a cross sectional view of the supplemental pressure application system during a bonding procedure in accordance with the present invention.

FIG. 11 is a cross sectional view of the supplemental pressure application system during a bonding procedure in accordance with the present invention. In FIG. 11, during progression of the bonding process, a supplementary pressure application system may be enabled. For example, the driving part 430 may move the elevating shaft 420 along the downward direction as the driving part 430 by a controller (not shown) that is separate from a controller (not shown) for the main driving motor 312 of the main pressure application system. Next, the pressing part 410 positioned within a recess 211 of the upper stage 210 may project from within the recess 211 (in FIG. 8) to a height as the elevating shaft 420 moves along the downward direction. Accordingly, the pressing part 410 may project from a bottom plane of the upper stage 210. Thus, a particular portion of the upper substrate 510 opposite to the pressing part 410 may be provided with a pressure higher than other portions of the upper substrate 510 such that the particular portion of the upper substrate 510 may be bonded to the lower substrate 520 more firmly than the other portions of the upper substrate. For example, the particular portion of the upper substrate 510 that is provided with a high pressure may include a sealant material and/or a spacer, whereas the other portions of the upper substrate 510 that is provided with a low pressure may include liquid crystal material.

Upon completion of the bonding process, the main pressure application system may move the upper stage 210 along an upward direction, and the driving part 430 of the supplemental pressure application system means may move the elevating shaft 420 along the upward direction to receive the pressing part 410 into the recess 211. In addition, as a force that affixes the upper substrate 510 to the upper stage 210 is released, the upper substrate 520 separates from the upper stage 210, whereby the bonded upper and lower substrates 510 and 520 may be held at the lower stage 220. Next, the bonded upper and lower substrates 510 and 520 may be removed from the vacuum chamber 100, after the vacuum chamber 100 is returned to an atmospheric pressure by a robotic arm (not shown).

The exemplary supplemental pressure application systems according to the present invention may not necessarily be employed only during bonding processes. For example, the supplemental pressure application systems according to the present invention may be employed after the bonding of the substrates is completed.

Figure 12:
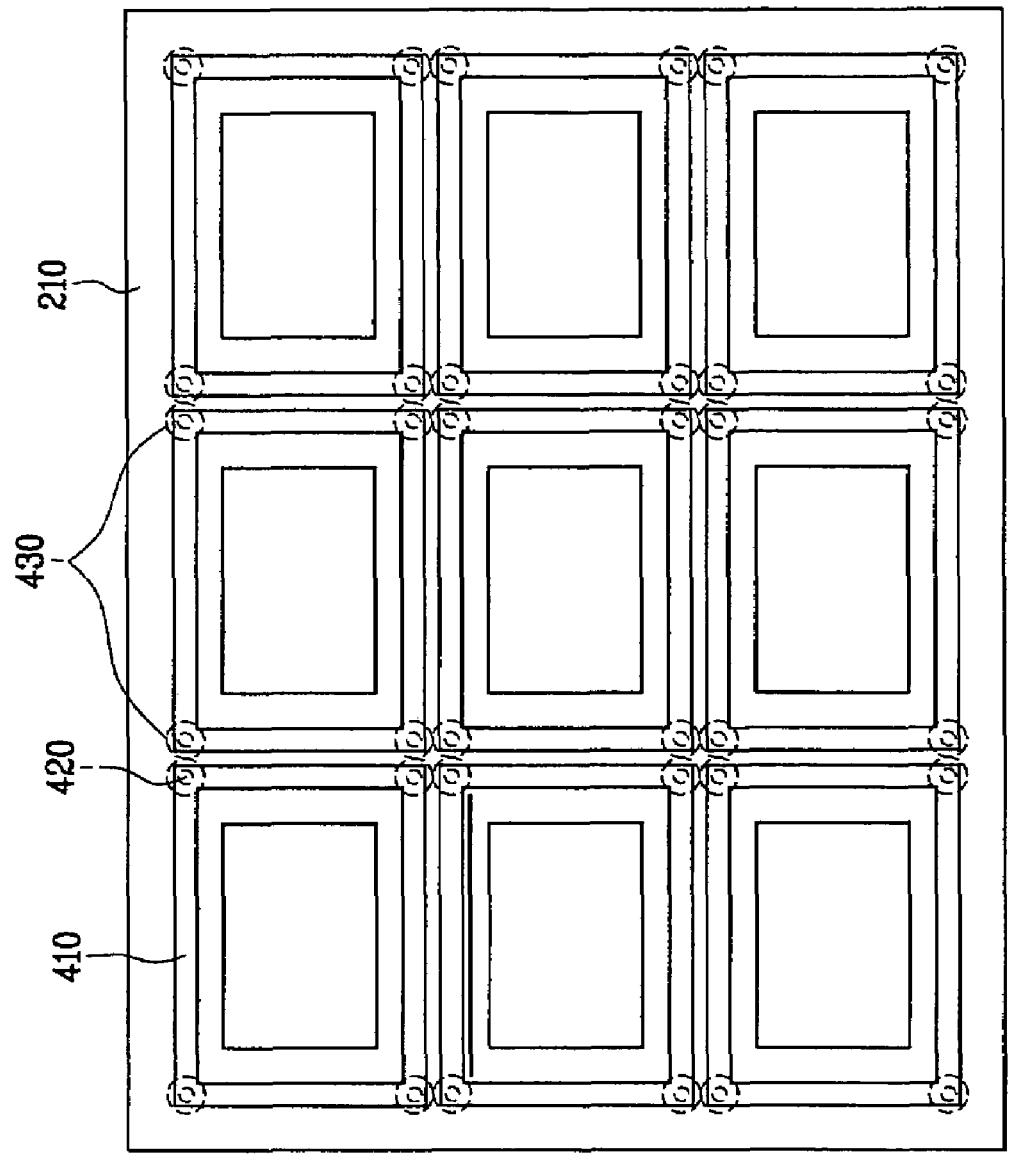
FIG. 12 is a plan view of another supplemental pressure application system in accordance with the present invention.

FIG. 12 is a plan view of another supplemental pressure application system in accordance with the present invention. In FIG. 12, the supplemental pressure application system may include an upper stage 210 having a plurality of pressing parts 410 for pressing individual cell regions that have sealant material coated thereon, and a plurality of drive parts 430 connected to the pressing parts 410 via a plurality of elevating shafts 420. Accordingly, each of the individual cell regions may be individually compensated for due to worn regions of the upper stage 210. The supplemental pressure application system has an advantage in that a pressure may be applied only to a particular cell region when an additional pressure application is deemed necessary.

Figure 13:
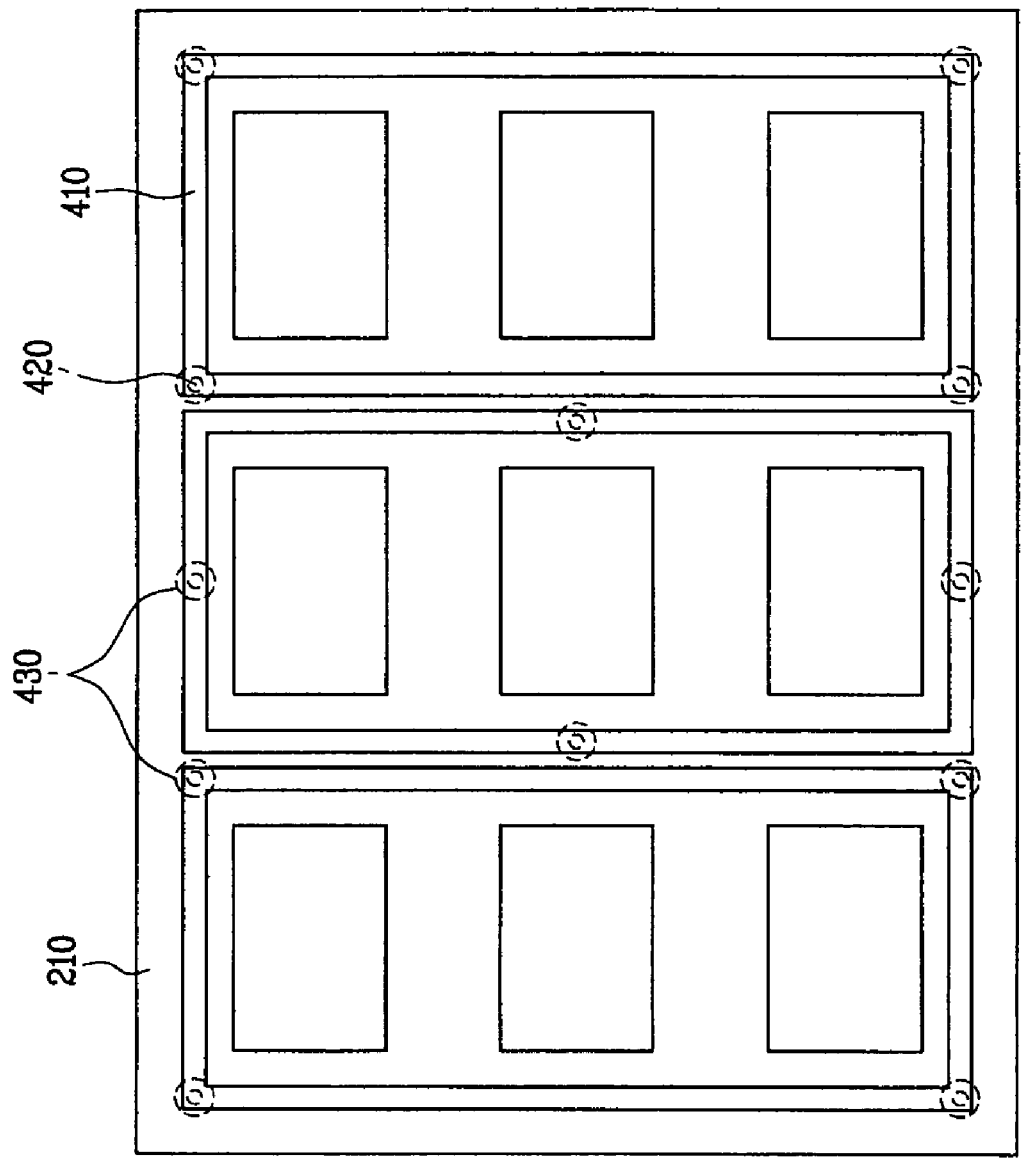
FIG. 13 illustrates a plan view showing another exemplary supplemental pressure application system in accordance with the present invention.

FIG. 13 illustrates a plan view showing another exemplary supplemental pressure application system in accordance with the present invention. In FIG. 13, the supplemental pressure application system may include an upper stage 210 having a plurality of pressing parts 410 for pressing individual groups of cell regions that have sealant material coated thereon, and a plurality of drive parts 430 connected to the pressing parts 410 via a plurality of elevating shafts 420. Accordingly, each of the groups of individual cell regions may be individually compensated for due to worn regions of the upper stage 210. The supplemental pressure application system has an advantage in that a pressure may be applied only to a particular group of cell regions when an additional pressure application is deemed necessary.

Figure 14:
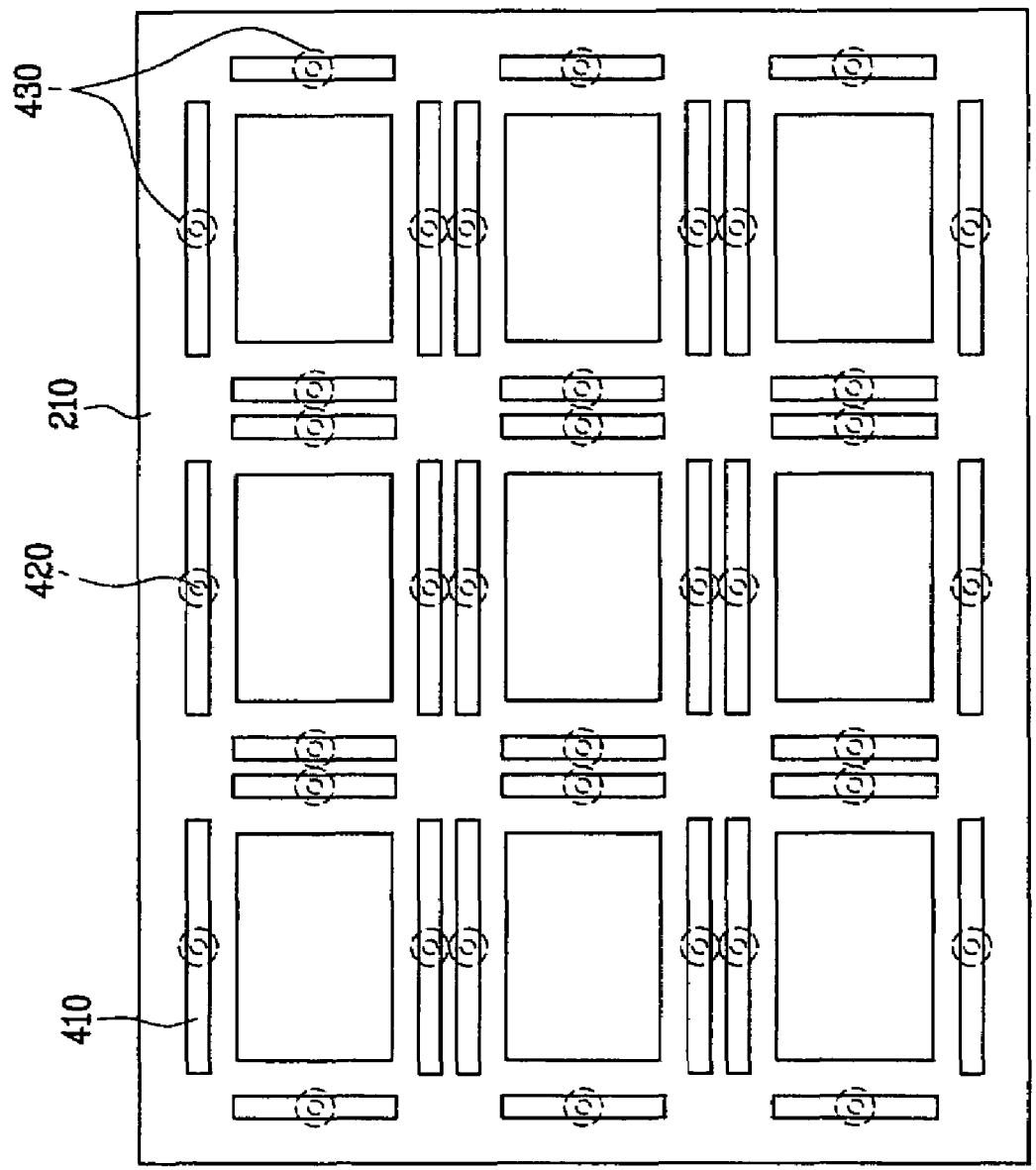
FIG. 14 is a plan view of another exemplary supplemental pressure application system in accordance with the present invention.

FIG. 14 is a plan view of another exemplary supplemental pressure application system in accordance with the present invention. In FIG. 14, the supplemental pressure application system may provide pressure application to different forms of sealant coated parts of different substrate models in conformity with the forms of the sealant parts. For example, selective projection in conformity with the forms of the different sealant coated parts of the different substrate models may be accomplished by dividing the pressing parts 410 into a plurality of blocks and selectively enabling the blocks by respective driving parts 430 and elevating shafts 420.

Figure 15:
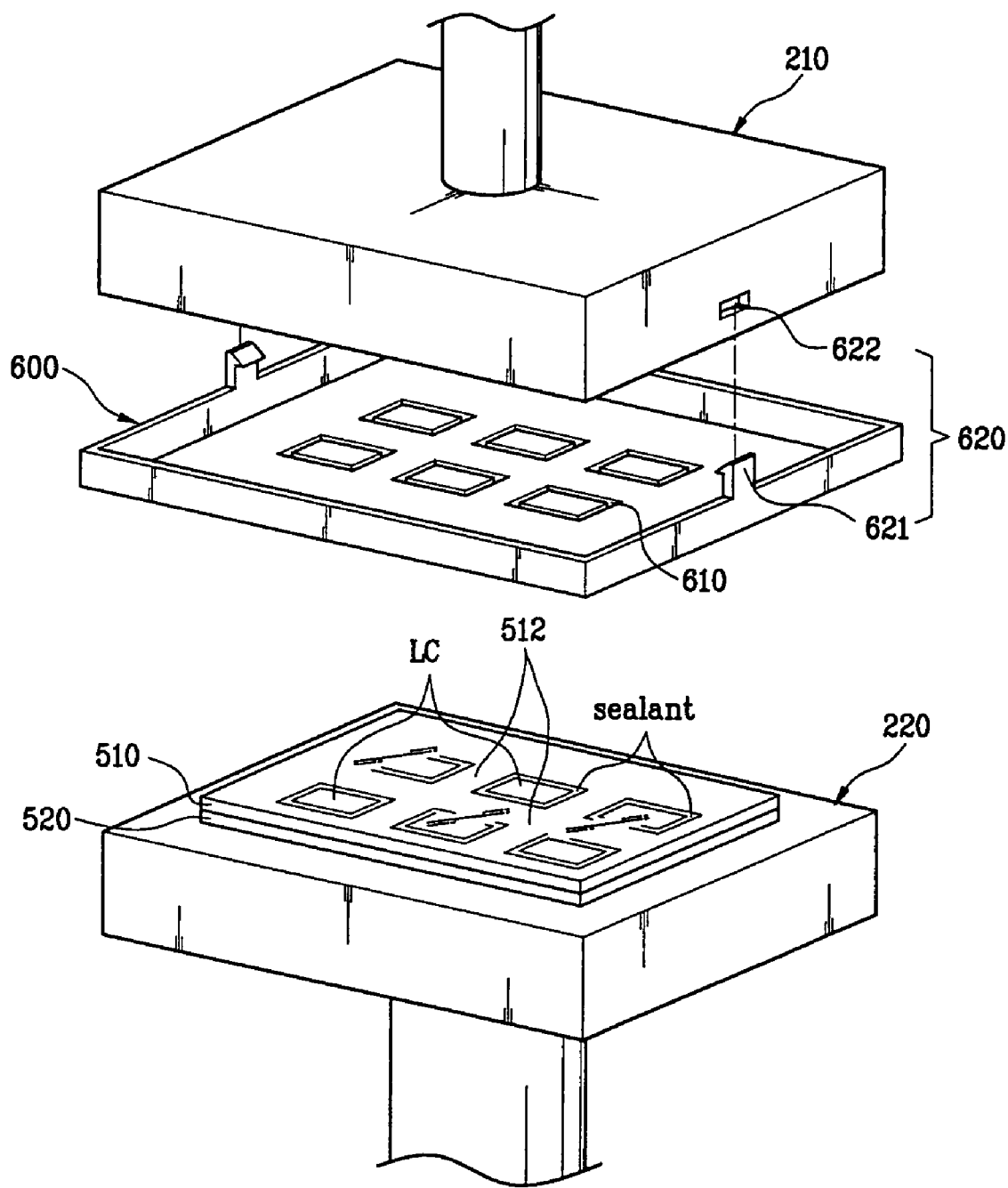
FIG. 15 is a perspective disassembled view of another exemplary supplemental pressure application system in accordance with the present invention.

FIG. 15 is a perspective disassembled view of another exemplary supplemental pressure application system in accordance with the present invention. In FIG. 15, the supplemental pressure application system may include a removable pressure application mask 600 applicable either to an upper stage 210 or a lower stage 220, with projection parts 610 projecting from each part to which application of a pressure higher than other parts is required. Accordingly, when a bonding process is completed, the pressure application mask 600 may be applied to the upper stage 210 without removing bonded first and second substrates 510 and 520 held at a top surface of the lower stage 220, and may repeat application of a pressure to a required part of the bonded first and second substrates 510 and 520. In addition, the pressure application mask 600 may be applied to the lower stage 220, wherein the bonded first and second substrates 510 and 520 may be placed on top of the pressure application mask 600, and the particular part has a repeated pressure applied thereto again.

Figure 18:
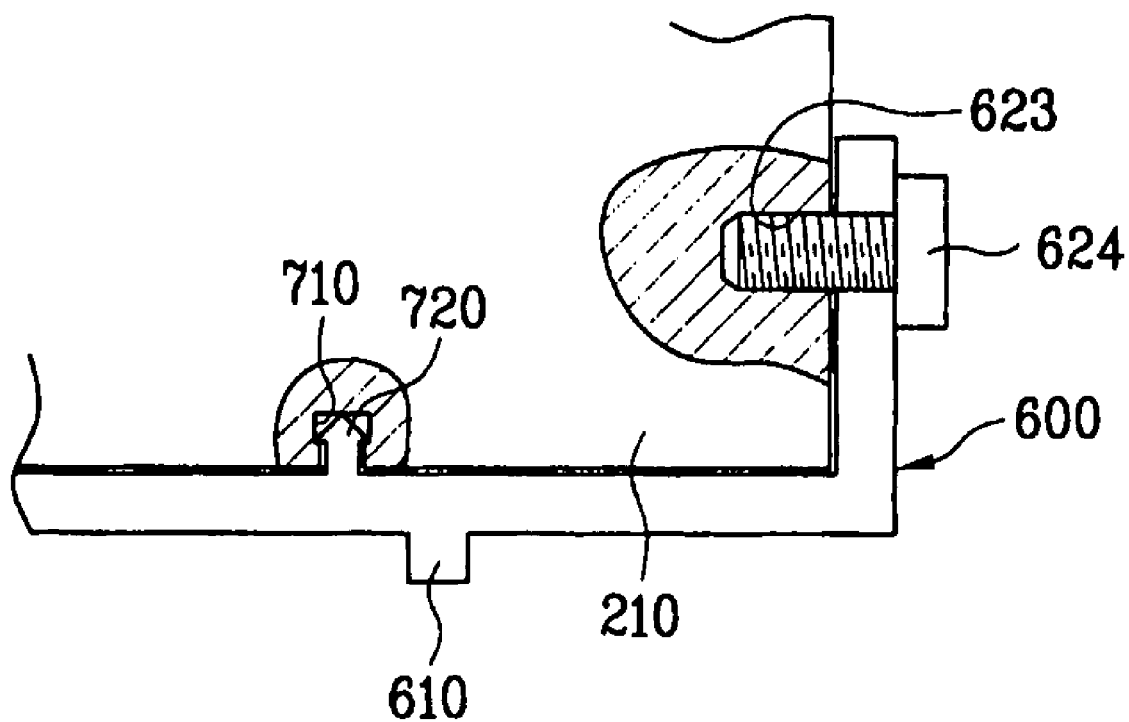
FIG. 18 is an enlarged cross sectional view of an exemplary fixing system in accordance with the present invention.

As shown in FIG. 18, the pressure application mask 600 may include a system in which covering of the entire upper stage 210 may not be required. In this case, a plurality of coupling slots 710 may be formed along an entire bottom surface of the upper stage 210, i.e., a surface opposite to the lower stage 220, and a projection 720 with a required height may be inserted into one of the plurality of coupling slots 710 in a portion where pressure re-application may be required.

Figure 16:
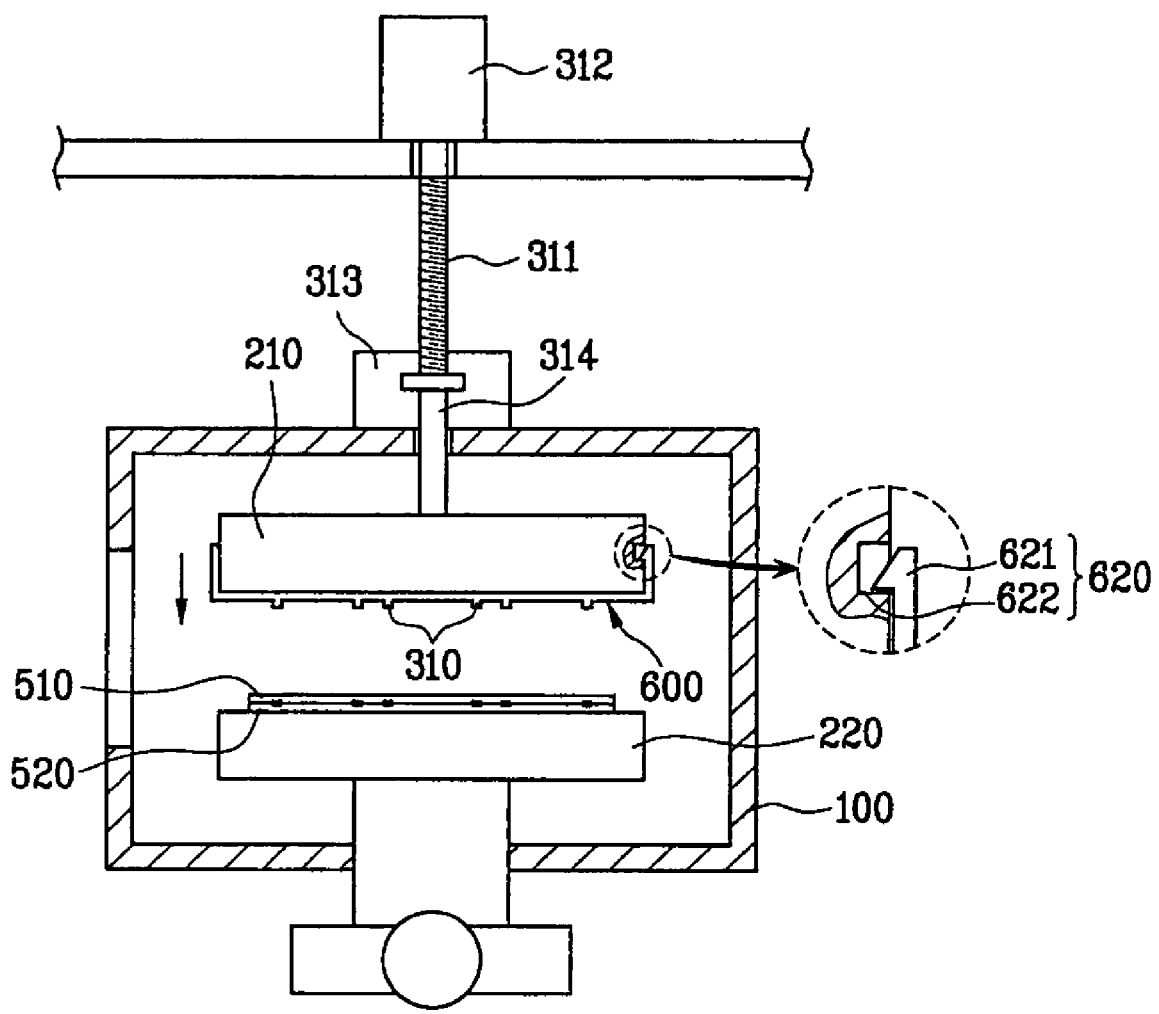
FIG. 16 is a cross sectional view of another supplemental pressure application system prior to a bonding procedure in accordance with the present invention.

FIG. 16 is a cross sectional view of another supplemental pressure application system prior to a bonding procedure in accordance with the present invention. In FIG. 16, a pressure application mask 600 may be attached to an upper stage 210 using a fastening system 620 for preventing the pressure application mask 600 from falling off the upper stage 210 during a bonding process for first and second substrates 510 and 520. The fastening system 620 may include a hook 621 formed on one of the pressure application mask 600 and the upper stage 210, and a catch 622 formed in the other one of the pressure application mask 600 and the upper stage 210. Alternatively, the pressure application mask 600 may be fastened to the upper stage 210 using a screw 624, as shown in FIG. 18.

The pressure application mask 600 according to the present invention may not be limited to a system separate from the upper stage 210 in order to fit to the upper stage 210. For example, the pressure application mask 600 may be permanently coupled to the upper stage 210 so that the pressure application mask 600 may not be removed during a vacuum bonding process. Accordingly, the pressure application mask 600 may include a structure that permits vacuum adsorption or electrostatic adsorption so that the first substrate 510 may be loaded onto the upper stage 210.

An exemplary process for making supplemental application of a pressure to first and second substrates during a series of steps for additional application of a pressure to a sealant coated region of the bonded first and second substrates by using the supplemental pressure application system according to the present invention will now be explained.

Figure 17:
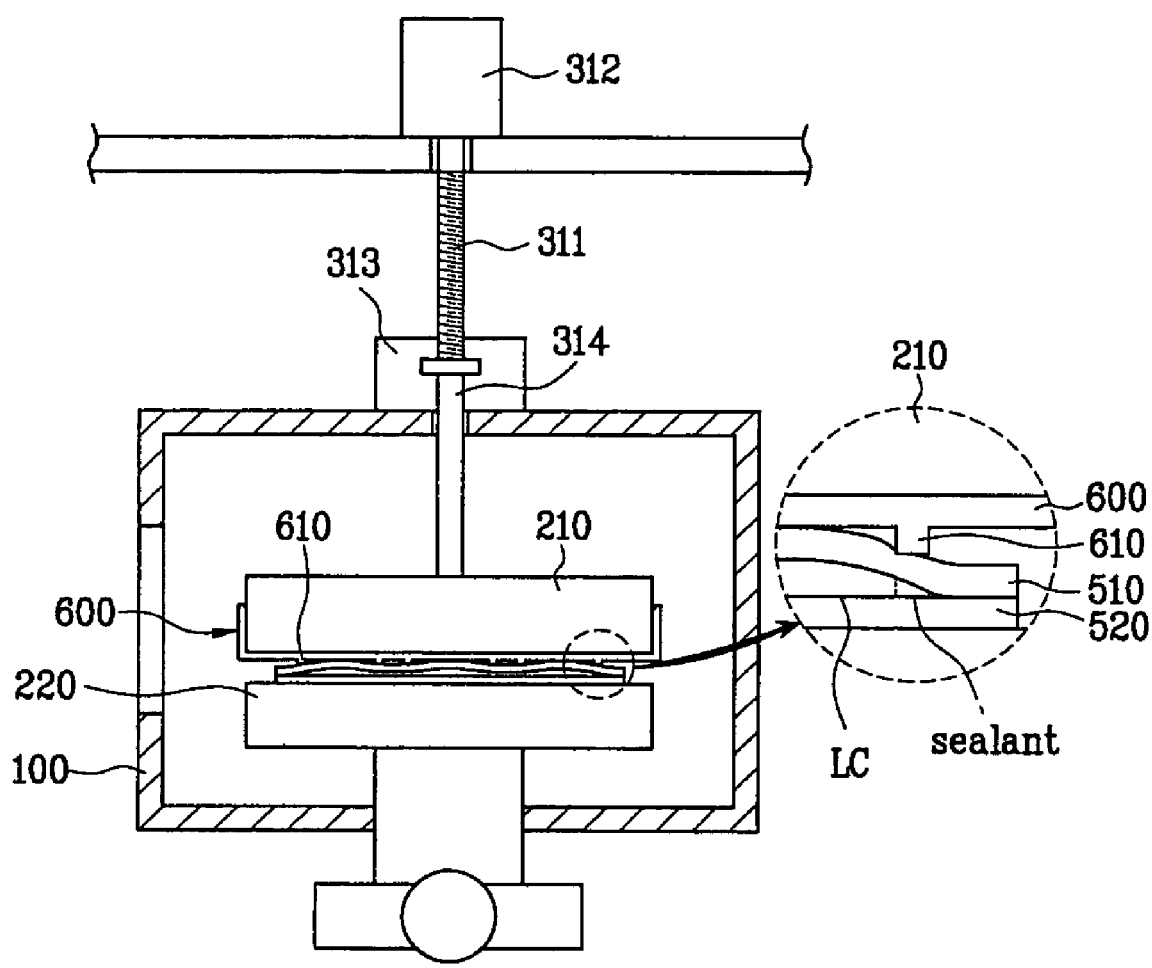
FIG. 17 is cross sectional view of the supplemental pressure application system during a bonding procedure in accordance with the present invention.

FIG. 17 is cross sectional view of the supplemental pressure application system during a bonding procedure in accordance with the present invention. In FIG. 17, when application of a pressure to a particular portion, or entire portion of bonded first and second substrates 510 and 520 may be required, a pressure application mask 600 according to the present invention may be attached onto an upper stage 210 by using a fastening system (not shown). When the pressure application mask 600 is attached to the upper stage 210, a main driving motor 312 of a main pressure application system may be enabled to move a main helical shaft 311 connected to the upper stage 210 along a downward direction. Accordingly, the pressure application mask 600 may again press down onto the bonded first and second substrates 510 and 520. Thus, a projected part 610 of the pressure application system 600 may be projected downward as compared to a particular portion i.e., a sealant coated part, of the bonded first and second substrates 510 and 520 to firmly bond the particular portion.

Next, when the additional pressure application is completed, the main driving motor 312 of the main pressure application system may be driven to again move the upper stage 210 along the upward direction. Accordingly, once the upper stage 210 has been adequately moved along the upward direction, the bonded first and second substrates 510 and 520 may be unloaded from the vacuum chamber 100 by a robot arm (not shown), and one pair of first and second substrates to be bonded may be loaded into the vacuum chamber 100 to repeat the bonding process and the additional pressure application.

The pressure application mask 600 according to the present invention may also provide for an operation of a compensation for a deviation occurred at particular portions of the upper and lower stages 210 and 220. For example, when a particular part of the upper and lower stages 210 and 220 may be worn, the pressure application mask 600 may include projected parts 310 positioned at the particular parts of the upper and lower stages 210 and 220, thereby compensating for a deviation caused by the worn portions of the upper and lower stages 210 and 220.

It will be apparent to those skilled in the art that various modifications and variations can be made in the liquid crystal display bonding apparatus of the present invention without departing from the spirit or scope of the invention. Thus, it is intended that the present invention cover the modifications and variations of this invention provided they come within the scope of the appended claims and their equivalents.

What is claimed is:

1. A supplemental pressure application system in a bonding apparatus for bonding first and second substrates of a liquid crystal display device together, comprising:
   a removable pressure application mask having a plurality of projection parts attached to one of an upper stage and a lower stage of the bonding apparatus by coupling slots that receive coupling portions of the projection parts and projecting toward a sealant region of one of the first and second substrates.

* * * * *